Figures 3, 4:
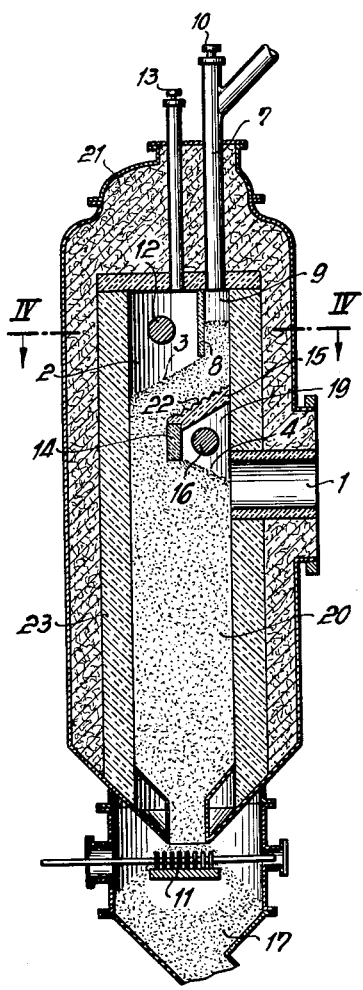

Jan. 16, 1962     O. BRETSCHNEIDER ETAL     3,017,263
PROCESS FOR PURIFYING METAL VAPORS
Filed Oct. 3, 1958                                                2 Sheets-Sheet 1
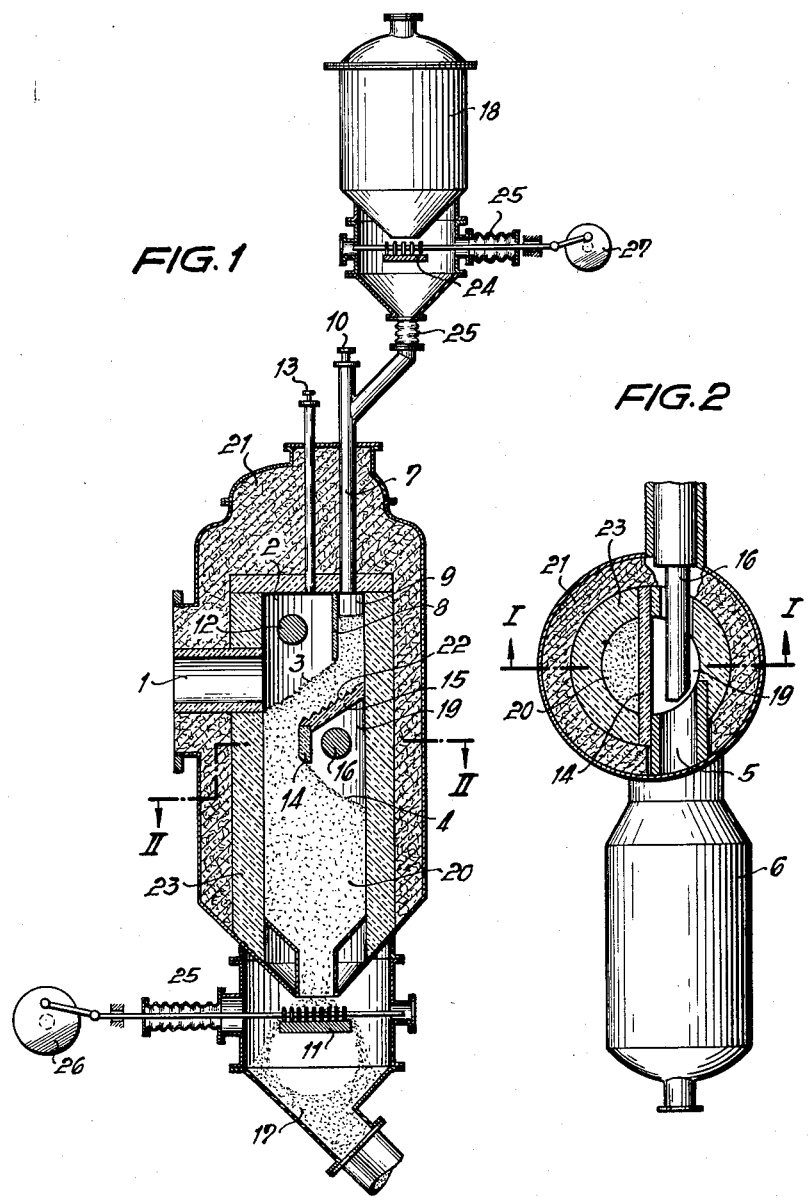
INVENTORS:
OTTO BRETSCHNEIDER,
LUDWIG BENDER AND
GERHARD JAEKEL
BY
*Connolly and Hutz*
THEIR ATTORNEYS

INVENTORS:
OTTO BRETSCHNEIDER,
LUDWIG BENDER AND
GERHARD JAEKEL 3,017,263
PROCESS FOR PURIFYING METAL VAPORS
Otto Bretschneider, Bonn (Rhine), Ludwig Bender, Bruhl, near Koln, and Gerhard Jaekel, Knapsack, near Koln, Germany, assignors to Knapsack-Griesheim Aktiengesellschaft, Knapsack, near Koln, Germany, a corporation of Germany
Filed Oct. 3, 1958, Ser. No. 765,256
Claims priority, application Germany Oct. 10, 1957
1 Claim. (Cl. 75—67)

The present invention relates to a process for the purification or separation of vapors, particularly superheated metal vapors such as, for example, vapors of magnesium, zinc, cadmium, an alkali metal or alkaline earth metal, as well as apparatus for executing the process.

When using the known methods of fabricating chemical products, especially metals, which products are obtained in industrial plants via the vapor phase, there always occur impurities which penetrate into the condensate. These impurities can disturb the process to such an extent that it is impossible to obtain a liquid or solid condensate in a pure form. Especially in the course of thermal processes, there occur as impurities particularly substances which when the vapor cools off, condense prior to the main product and which clog the apparatus by premature deposits.

It has now been attempted to filtrate the vapors produced in a factory-size plant through a layer of granular material at elevated temperatures by which method the solid substances which were carried along shall be separated and the vaporous contaminations deposit. After a short time, however, such devices are clogged by the deposits in the granular filter material which can only be removed by interrupting the operation and exchanging or purifying the material. Even when it is possible to avoid the undesirable interruption in the continuous admission of vapor by installing a parallel arranged series of filters, an inoperative filter will gradually become clogged in the course of the operation especially by the solid impurities carried along with the vapor thus provoking a steadily increasing pressure of the vapor produced. It is known that fluctuations of this kind in the system of apparatus have an unfavorable influence on the entire plant production.

The present invention provides a new process for purifying metal vapors, especially superheated magnesium vapors, according to which the operation is carried out such that these vapors are passed through lumpy or granular material loosely heaped while the lumpy material is permanently kept in movement by continuous renewal. The vapor to be purified, on its way through the lumpy material, passes through a zone of decreasing temperature in such a manner that, when leaving the lumpy material, the vapor has a temperature slightly above the condensation point of the pure vapor phase of the final product. The lumpy material also passes through a difference in temperature between the admission and the outlet of the vapor.

When using this method, the lumpy material can be conducted in a co-current to the vapor. It may, however, also be conducted in a countercurrent to the vapor.

According to another feature of the present invention, the vapor, prior to encountering the lumpy material, is kept at such a high temperature by means of a controllable heating device that premature condensation of the impurities contained in the vapor cannot occur. During the period of contact with the vapor, the lumpy material, by means of a controllable heating, is kept at a temperature which still lies above the condensation temperature of the pure final product but below the condensation temperature of the impurities.

Finally, the temperature of the lumpy material and of the vapors traversing this material can be adjusted by means of regulating the quantity and the speed at which the freshly supplied, still cold material is charged to the furnace, and thus also by means of the rate at which this material flows through the condensation zone of the impurities. Moreover—possibly also as an additional measure—the temperature of the lumpy material and of the vapors flowing through this material can be adjusted by varying the thickness of layer of the material situated opposite to the zone of admission of the hot vapors and thus being within the condensation zone of the impurities.

The process of the invention is also suitable when working under reduced pressure. If necessary, any premature undesired condensation at cooler spots can be prevented by flushing with inert gas, for example with hydrogen, nitrogen or argon which measure serves especially to keep free the observation points as well as the inlet- and outlet-pipe connections of the plant.

In the process of the invention, the components contaminating the vapors can also be separated by reaction with the lumpy or granular material. In the course of such a reaction, a component corresponding to the pure vapor phase can be set free and then escape together with the purified vapors.

As a final measure, the vapors which have been purified in the first stage of the process are condensed in the second stage.

The apparatus suitable for use in carrying out the process of this invention consists substantially of a vertical furnace provided with a down pipe arranged on top of the furnace through which pipe the lumpy or granular material is supplied from a storage tank, with a lower discharge for the material, with a horizontal inlet-pipe connection for the vapor and an outlet-pipe connection for the vapor arranged on a different altitude level. The outlet-pipe connection connects the furnace with the condenser as well as with an inclined runoff plane for the lumpy material arranged in the interior of the furnace, and with an upper and lower guide member which, within the zone of the admission and outlet of the vapor, create spaces which are free of material and which are kept at a certain temperature by means of controllable heating elements. The surface of the inclined runoff plane which, together with the vertical guide members in the interior of the furnace, guides the flow of the material, should advantageously be grooved or roughened. In addition to being on a different altitude level, the inlet-pipe connection for the vapor may form a right angle with the outlet-pipe connection for the vapor. The upper guide member may also be arranged such that its height can be adjusted in order to regulate the thickness of layer of the granular material flowing down the inclined runoff plane. Moreover, there have, for example, been installed observation windows projecting over the wall which surrounds the furnace and the insulation layer.

With regard to the process and the apparatus of carrying the invention into effect, the following details are given:

A clogging of the apparatus is prevented by continuously renewing the lumpy or granular material used as a filter, which material is thus permanently kept in movement; this method also avoids an agglomeration of the individual filter grains. Moreover, it is rendered possible that the impurities which deposit on the grains are continuously discharged from the apparatus together with the filter material without having to apprehend an interruption in the operation or a periodically occurring pressure of the vapor in the apparatus.

Thanks to another characteristic feature of the invention, i.e. the cooling off of the contaminated hot vapor passing through the filter layer, there is attained, in addition to the filtration action mentioned above, also a condensation of those impurities which condensate above the point of condensation of the pure vapor phase.

The device according to the invention renders possible a mode of operation according to which the surface of the granular material has that temperature upon the admission of the vapor at which there does not as yet take place a condensation of individual vapor portions, for at this point the empty space in the apparatus situated above the flowing material is kept at such a high temperature that no condensation of the superheated vapor jet can take place as yet. The condensation of the impurities having a high boiling point only commences closely below the surface through which the vapor jet penetrates into the lumpy material, i.e. the granular material is kept, by a more or less rapid supply of the material and rate of flow as well as by a more or less thick layer of the material, at that desirable temperature at which all impurities deposit on the grains which condensate above the condensation point of the pure vapor phase. It is possible to attain a particularly pronounced difference in temperature within the filter layer of the granular material by conducting the vapor and the granular material in a countercurrent to one another.

The purification of vapors by the process of the invention can be carried out in apparatus operated under reduced pressure, or also under normal or elevated pressures.

The granular material to be used must in all cases be a substance which is inert towards the pure vapor phase. In special cases it may be advantageous to employ a pure granular material which reacts with the vapor contaminations approximately according to a chemical reaction. In the course of this operation the reaction products obtained can either be discharged together with the granular material, or there is formed, by the reaction of the impurities with the granular material, an additional main product which leaves the furnace together with the pure vapor phase. It is, furthermore, possible that, when the impurities react with the granular material, there are formed reaction products which condense far below the condensation point of the pure vapor phase and, therefore, cannot prejudice the purity of the main product condensing at a later time because these reaction products leave the condenser, being connected in series with the purification plant, still in the vapor phase.

Two forms of construction of a purification plant suitable for use in carrying out the process of this invention are shown diagrammatically in the attached drawings:

FIG. 1 is an end section of a purification plant according to line I—I of FIG. 2, FIG. 2 is a top view partially sectioned of this plant according to line II—II of FIG. 1, FIG. 3 is an end section of a second form of construction according to line III—III of FIG. 4, and FIG. 4 is a top view partially in section according to line IV—IV of FIG. 3.

In FIGS. 1 and 2 of the drawings, there is shown the inlet-pipe connection 1 for the vapor and the outlet-pipe connection 5 for the vapor from the furnace surrounded with a wall. The furnace is also surrounded by an insulation layer. Granular or lumpy material 20 flows into the furnace from the top towards the bottom. The material 20 is withdrawn from storage tank 18 via a feeding device 24 operated by drive 27 and conducted via down-pipe 7 for the inlet 9 for the material into the furnace. The path of the material is guided by upper guide member 8, an inclined runoff plane 15 whose surface 22 may be grooved or roughened, as well as by lower guide member 14. By means of guide members 8 and 14 there are created within the zone of the admission and outlet of the vapor an upper empty space 2 and a lower empty space 19 which can be kept at a controlled temperature by the, for example, electric heating elements 12 and 16. At the same time, the surfaces 3 and 4 of the material within these empty spaces 2 and 19 are kept at a corresponding temperature. The pouring height of the material in inlet 9 can be controlled through observation window 10 mounted on down pipe. The temperature in empty space 2 is measured through observation window 13. Further observation windows can be installed in other places if desired.

The granular material leaves the apparatus through lower discharge 11 provided with drive 26 and outlet 17. The purified vapor leaves the furnace at 5 and enters condensers which are connected in series.

All connections consist of spring bellows 25 which are dustproof and impervious to the material and made, for example, of metal; for example, the connection between upper storage tank 18 and down pipe 7, or the connections between drive 27 and feeding device 24, or between drive 26 and discharge 11 of the purification plant.

For example the purification of magnesium vapor, which was produced by thermal reaction of a raw material containing magnesium oxide with a reduction agent such as ferrosilicon, in a furnace under reduced pressure or under normal pressure conditions at temperatures above 1400° C. was carried out as follows:

There are, inter alia, carried along into the condenser silicon oxide, iron, magnesium and calcium in the magnesium vapors in the form of vapor, as well as mixture dust in solid form whereby the condensate is contaminated to such an extent that, when working according to the known methods, it is not possible to obtain a pure magnesium metal in a satisfactory yield. In the apparatus as shown in FIG. 1, the vapor can be liberated from the contaminations carried along with it to such a degree that a high-grade magnesium is obtained in the condenser. The magnesium vapor, upon leaving the reduction furnace not shown in the drawing, is admitted into the purification plant at 1 and is kept at such a high temperature by means of an additional electric heating element 12 in the upper empty space 2 that no condensation can take place at this point. In the case of the contaminations mentioned above, a temperature of about 1300° C. is sufficient at this point when working under reduced pressure. Space 2 which is kept at a high temperature is limited by surface 3 of the granular material, suruface 3 being likewise kept at a temperature of about 1300° C. by the heat-radiating heating element 12. This temperature can be controlled optically through observation window 13. The granular material which, in this case, may consist of burned dolomite or also of coke, is continuously charged to space 9 from storage tank 18 through down pipe 7 with observation window 10, which space is separated from empty space 2 by means of guide member 8. Below guide member 8 the granular material flows continuously in a comparatively thick layer over an inclined runoff plane 15 and, guided by another guide member 14, down to discharge 11 where the material leaves the purification plant through outlet 17. Below the inclined runoff plane 15, another empty space 19 is created by guide member 14 which is kept at a temperature situated somewhat above the condensation point of pure magnesium vapor by means of another electric heating element 16. Pure magnesium, according to the vapor pressure curves of this substance, condenses under a pressure of about 25 mm. of mercury at about 800° C. The temperature is then kept at about 850° C. by means of heating element 16. Through surface, the pure vapor leaves the granular material and enters condenser 6 through outlet 5 in which condenser the pure magnesium is condensed and collected. When operating this purification plant, the silicon contents of a thermally produced magnesium was reduced from formerly 0.5% to about 0.01% by weight.

The purification according to the invention can, however, also be carried out by conducting the vapor in a countercurrent to the flowing granular material:

In FIG. 3, the vapor to be purified, upon leaving the reduction furnace, enters lower empty space 19 which by means of heating element 16 is kept at such a temperature that no condensation can take place at this point. Surface 4 of granular material 20 has the same temperature as this adjacent empty space 19. Through down pipe 7 the granular material enters space 9 wherein the height of the heaped up material is controlled by means of observation window 10. After having passed guide member 8, the granular material flows to the space situated below upper empty space 2 which, by means of heating element 12 is kept somewhat above the condensation point of the pure magnesium vapor. The maintenance of this temperature can be controlled through observation window 13 through which the temperature of surface 3 of the granular material is pyrometrically measured. This granular material travels in a downward direction via inclined runoff plane 15 and along guide member 14 in a countercurrent to the vapor flowing in an upward direction. The purified vapor now leaves empty space 2 through outlet 5 and enters condenser 6 being connected in series.

The following examples serve to illustrate the invention, but they are not intended to limit it thereto:

*Example 1*

To a furnace which serves to condensate the contaminations carried along in superheated vapors and having a height of 2.5 m. and an inside diameter of 80 cm., there are charged 25 cu. m. (standard conditions) per hour of an initial vapor of about the following composition: 96.5% of magnesium; 1% of silicon; 0.1% of iron; 0.5% of calcium and 0.5% of manganese; remainder: solids (calculated in percentages by weight on the vapor composition). The zone of admission of the vapors into the furnace is kept at about 1300° C. by means of a controllable heating element; the operation is carried out under a pressure of about 30 mm. of mercury.

There are simultaneously passed through the furnace in a downward direction about 30 kilos or 60 liters per hour of lump coke having a diameter of about 10 to 15 mm. After having passed in a co-current or countercurrent through a layer of coke the pouring height of which can be regulated, the vapors leave the condensation furnace at a final temperature of about 850° C. under a pressure of 30 mm. of mercury. The zone where the vapor passes through the flowing layer of coke as well as the zone where the vapor leaves the furnace are kept at a temperature situated above the condensation point of the vapor phase of the pure final component by means of a controllable heating device. The coke is charged in the cold state to the upper part of the furnace and is discharged at the bottom with a final temperature of likewise 850° C.

After the vapors have been purified by passing through the furnace, the discharged vapors have about the following composition: 99.93% of magnesium; 0.02% of silicon; 0.001% of iron; 0.01% of calcium and 0.03% of manganese (calculated in percentages by weight). These practically pure magnesium vapors are condensed in a subsequent condenser at temperatures dropping from about 800° C. to about 500° C. The solid or liquid contaminations having condensed or deposited already previously in the furnace leave the furnace through the lower discharge together with the lump coke.

In order to prevent undesirable clogging owing to premature condensation and in order to keep the observation windows free, there is maintained a permanent hydrogen current in the vacuum and condensation furnace for purposes of flushing, said current being passed in through the windows, the inlets for the controllable heating devices, through the upper coke inlet and lower coke discharge and leaving the furnace together with the purified vapor.

*Example 2*

The operation is carried out as described in Example 1 with the exception that instead of coke, there are used per hour about 60 kilos, i.e. 60 liters of dolomite having a diameter of about 10 to 15 mm. as a lumpy or granular material. The calcium and silicon contents of the initial vapor react with the magnesium oxide contained in the dolomite, in the course of which reaction the magnesium is set free from the dolomite with the formation of calcium silicates, the magnesium leaving the furnace together with the practically pure magnesium component of the vapor and being condensed in the condenser.

The matter set forth in the foregoing specification regarding the applicability of magnesium to the process also applies, in principle, to the other metals set forth in the disclosure.

Obviously many modifications and variations of the present invention are possible in the light of the above teachings. It is, therefore, to be understood that within the scope of the appended claim the invention may be practiced otherwise than as specifically described.

We claim:

A process for purifying superheated magnesium vapors of nonvaporous impurities and vaporous impurities which have a higher condensation temperature than the magnesium vapors comprising the steps of continuously supplying granular material to one end of a treating zone, continuously withdrawing said material from the opposite end of said zone, directing the material in a definite path as it travels through said zone to form a pair of isolated chambers within said zone which chambers are separated by a moving layer of the granular material, introducing said impure superheated magnesium vapors into the moving granular material layer at a point adjacent one of the isolated chambers, heating the isolated chamber and thus the granular material adjacent thereto to a temperature which is above the condensation temperature of both the magnesium vapor and the vaporous impurities contained therein, passing the vapors through the moving layer of granular material to a point adjacent the second isolated chamber, heating said second isolated chamber and thus the granular material adjacent thereto to a temperaure which is above the condensation temperature of the magnesium vapor but which is below the condensation temperature of the vaporous impurities whereby the temperature of the granular material and the vapors is decreased along the path travelled by the vapors through said material and only the vaporous impurities are condensed, and discharging the magnesium vapor from the heating zone.

References Cited in the file of this patent
UNITED STATES PATENTS

| | | |
|---|---|---|
| 1,994,358 | Holstein | Mar. 12 1935 |
| 2,003,487 | Hansgirg | June 4, 1935 |
| 2,494,552 | Mohler | Jan. 17, 1950 |
| 2,550,684 | Fouquet | May 1, 1951 |
| 2,760,770 | Robson | Aug. 28, 1956 |
| 2,781,257 | Wilkins | Feb. 12 1957 |
| 2,865,739 | Alderson | Dec. 23, 1958 |